H. CLAY.
Underground-Telegraph Conductor.

No. 226,159.  Patented April 6, 1880.

Witnesses:
F. Cooper.
W. F. Kücher

Inventor:
Henry Clay,
by John A. Biedersheim
ATTORNEY.

UNITED STATES PATENT OFFICE.

HENRY CLAY, OF PHILADELPHIA, PENNSYLVANIA.

UNDERGROUND-TELEGRAPH CONDUCTOR.

SPECIFICATION forming part of Letters Patent No. 226,159, dated April 6, 1880.

Application filed February 19, 1880.

*To all whom it may concern:*

Be it known that I, HENRY CLAY, a resident of the city and county of Philadelphia, and State of Pennsylvania, and a citizen of the United States, have invented new and useful Improvements in Laying Telegraph, Telephone, and other Wires; and I do hereby declare the following to be a clear and exact description of the nature thereof, reference being had to the accompanying drawings, in which—

Figure 1:
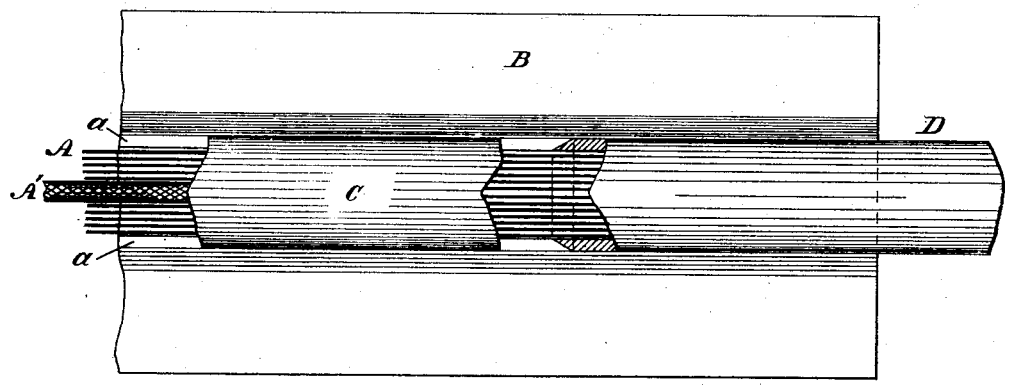
Figure 2:
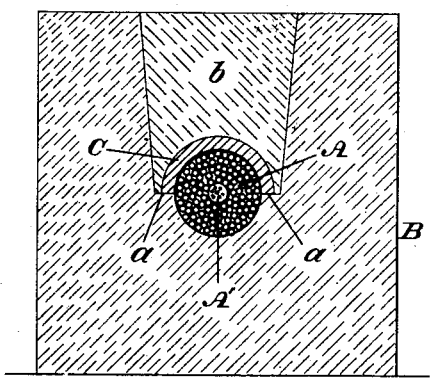
Figure 3:
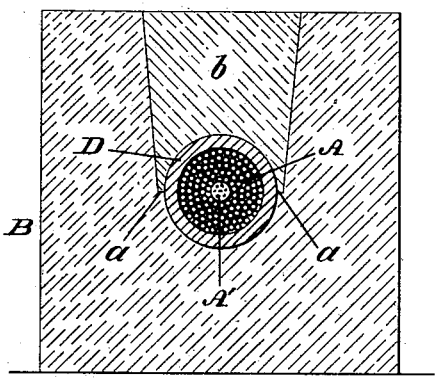

Figure 1 is a top or plan view of the mode of laying wires embodying my invention. Figs. 2 and 3 are end views thereof.

Similar letters of reference indicate corresponding parts in the three figures.

My invention consists in inclosing wires in a channel formed of a guttered base and a covering-cap, which is cemented to said base, thus insulating the wires and protecting them from moisture and action of the earth, and permitting the removal of any or all of the wires.

It also consists of absorbent material passed through the channel among the wires for keeping their coverings saturated with insulated and protecting fluid.

It also consists of pliable and non-corrosive pipe connected to the ends of the channeled base by lap-joints, so as to be hermetically sealed for safely running the wires through rivers, streams, marshes, &c.

Referring to the drawings, A represents a series of wires covered with rubber or other insulating material. B represents gutters, of cement, terra-cotta, &c., molded into shape and laid end to end in a trench in the ground. The wires are placed in said gutters or guttered bases B and covered by arch-shaped or flat caps C, each of which is supported on shoulders *a a* at the sides of the grooves of the gutters, after which a mass, *b*, of cement or terra-cotta is run or poured over the cap, thus sealing the same and securely and tightly inclosing the wires, so that they are protected and insulated.

During the operation of laying the wires I pass a length, A′, of wick or other absorbent material through the gutters among the wires, and immerse the ends of said material in hydrocarbon or other suitable fluid or oil, so that by capillary attraction the fluid or oil will be conveyed through the gutters and saturate the coverings of the wires, so that cracking and rotting of the same are prevented.

D represents a length of pipe, formed of lead or other pliable and non-corrosive material, and having its opposite ends fitted against the shouldered portions *a* of the grooves and caps C, the contiguous ends of the pipe D and portions *a* and caps C being beveled, so that they form a lap-joint. When the mass *b* of cement, terra-cotta, &c., is laid on the caps C, a quantity of the same is run over each end of the pipe within the gutters, and thus the ends of the pipe are securely sealed, this feature of my invention being serviceable where the wires are run through streams, marshes, &c., the gutters stopping near the shore or at the margin of the marshes, &c., and the pipe continuing the conduit through the water or moist places.

In case it is desired to remove a wire it is readily withdrawn through the gutters and pipe, and a fresh wire may be introduced by attaching it to the one to be removed, so as to follow it as it is drawn out.

Having thus described my invention, what I claim as new, and desire to secure by Letters Patent, is—

1. The gutters B, with caps C, and the covering mass *b*, substantially as and for the purpose set forth.

2. The wires A and gutters B, in combination with the wick or absorbent material A′, placed among the wires and having its ends immersed in fluid or oil, substantially as and for the purpose set forth.

3. The combination, with the gutters B and caps C, of the pipe D, having its ends lap-jointed therewith, substantially as and for the purpose set forth.

HENRY CLAY.

Witnesses:
JOHN A. WIEDERSHEIM,
W. F. KIRCHER.